(12) United States Patent
Shinohara

(10) Patent No.: US 10,356,253 B2
(45) Date of Patent: Jul. 16, 2019

(54) IMAGE READING SYSTEM IN WHICH AN APPARATUS ACCEPTS AN INSTRUCTION TO START READING A DOCUMENT BY USING SETTING INFORMATION IN A SCAN JOB RECEIVED FROM AN INFORMATION PROCESSING APPARATUS, IMAGE READING APPARATUS, AND IMAGE READING METHOD OF IMAGE READING SYSTEM

(71) Applicant: CANON KABUSHIKI KAISHA, Tokyo (JP)

(72) Inventor: Taku Shinohara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,041

(22) Filed: Dec. 19, 2017

(65) Prior Publication Data

US 2018/0183949 A1 Jun. 28, 2018

(30) Foreign Application Priority Data

Dec. 26, 2016 (JP) .................................. 2016-251922

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00228* (2013.01); *H04N 1/0097* (2013.01); *H04N 1/00241* (2013.01); *H04N 1/00408* (2013.01); *H04N 2201/0094* (2013.01)

(58) Field of Classification Search
CPC .......... H04N 1/00228; H04N 1/00241; H04N 1/00408; H04N 1/0097; H04N 2201/0094
USPC ....................................... 358/1.15, 1.14, 1.13
See application file for complete search history.

(56) References Cited

U.S. PATENT DOCUMENTS

2007/0121147 A1* 5/2007 Corona ................. G06F 3/1206
358/1.15
2015/0355874 A1* 12/2015 Kamoi ................. H04N 1/0023
358/1.15

FOREIGN PATENT DOCUMENTS

JP 2005-277564 A 10/2005

* cited by examiner

*Primary Examiner* — Douglas Q Tran
(74) *Attorney, Agent, or Firm* — Venable LLP

(57) ABSTRACT

In an image reading system that includes an information processing apparatus and an image reading apparatus which can communicate with the information processing apparatus, the image reading apparatus receives, from the information processing apparatus, a scan job and causes a reader to read a document in response to a user instruction, transmits an execution status of the scan job to the information processing apparatus, and transmits the image data obtained by the reading to the information processing apparatus. The information processing apparatus transmits the scan job, makes a request to the image reading apparatus to obtain the image data of the document based on the execution status of the scan job, and receives the image data from the image reading apparatus.

14 Claims, 16 Drawing Sheets

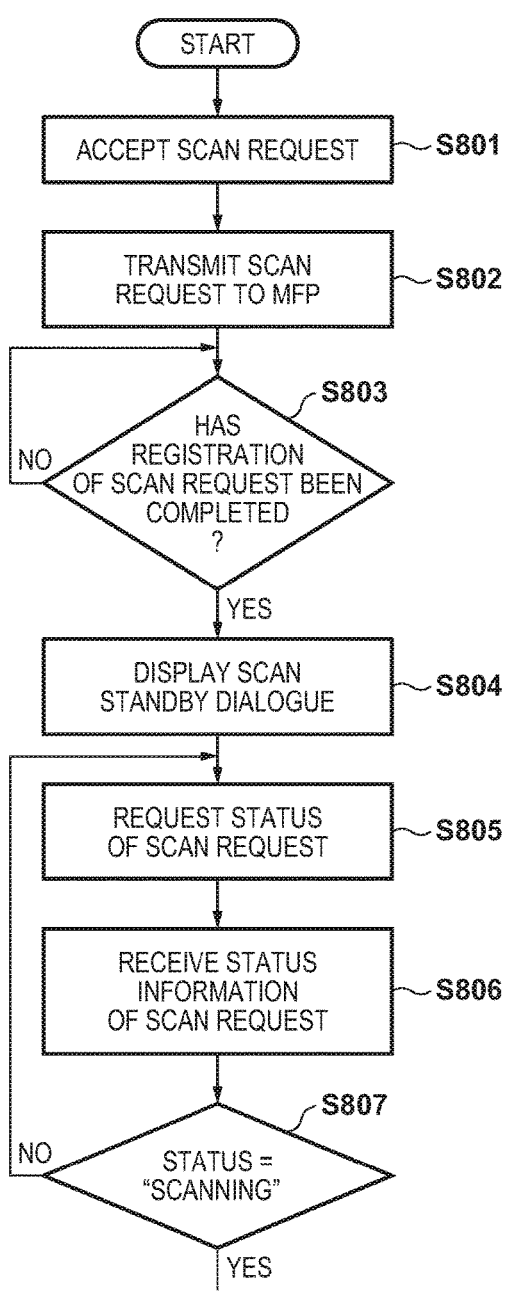
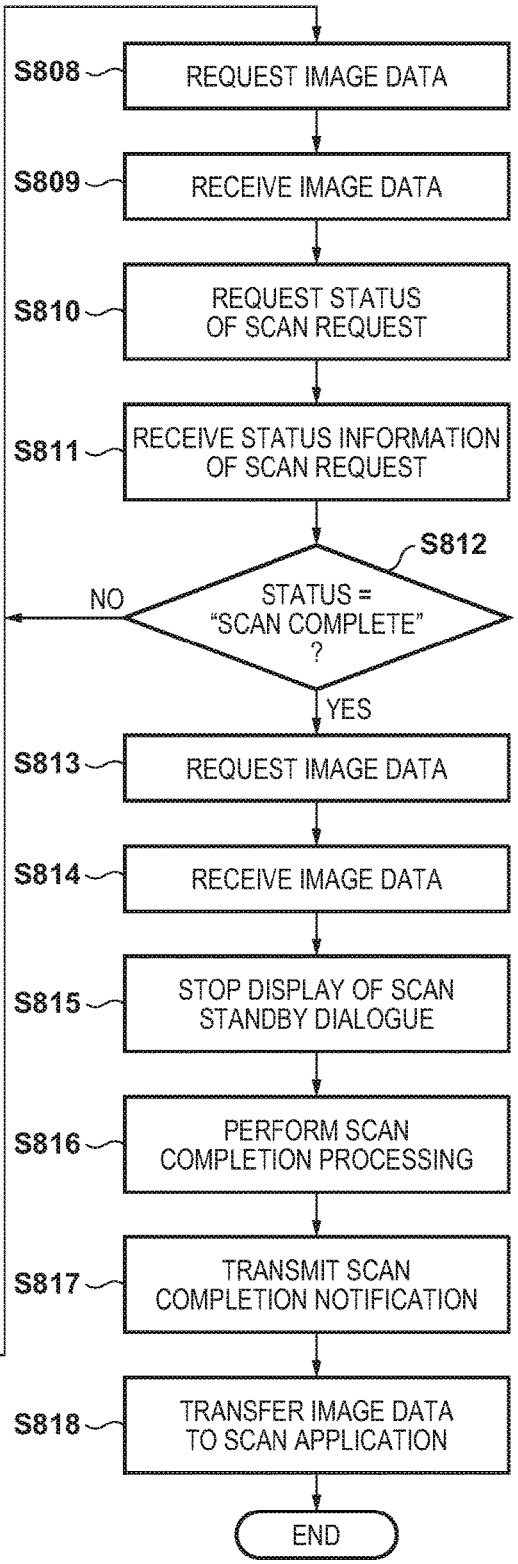
FIG. 8

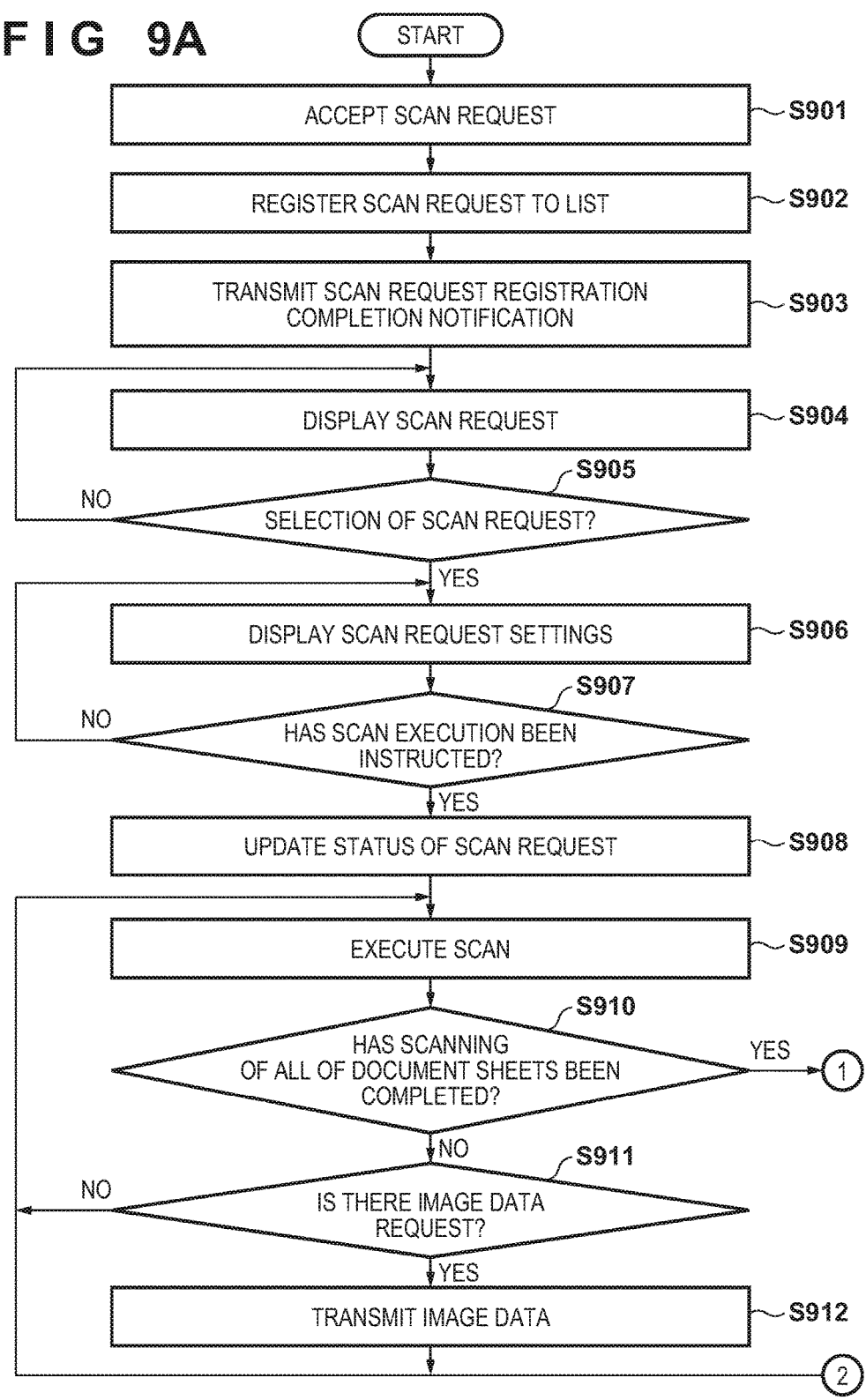

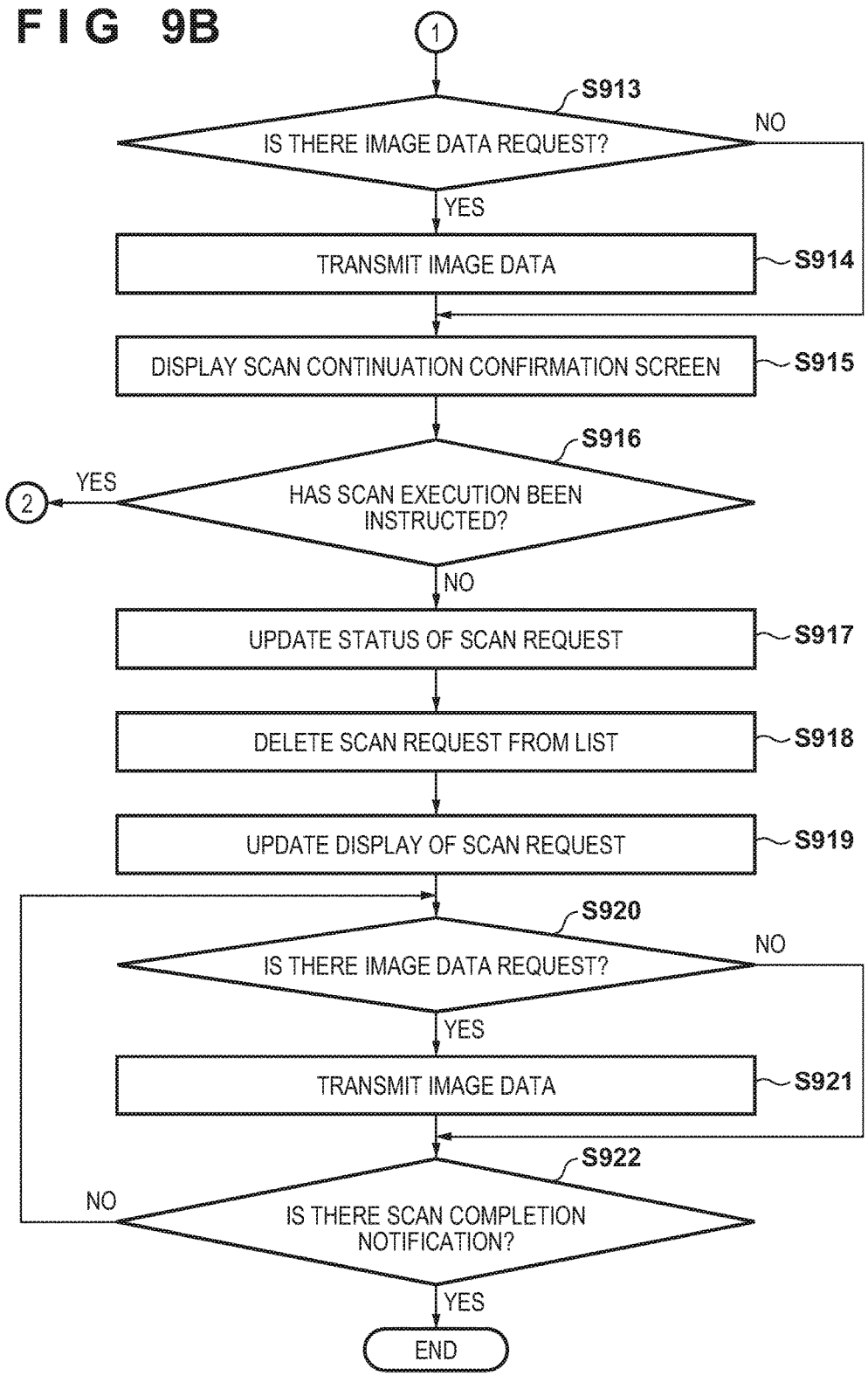

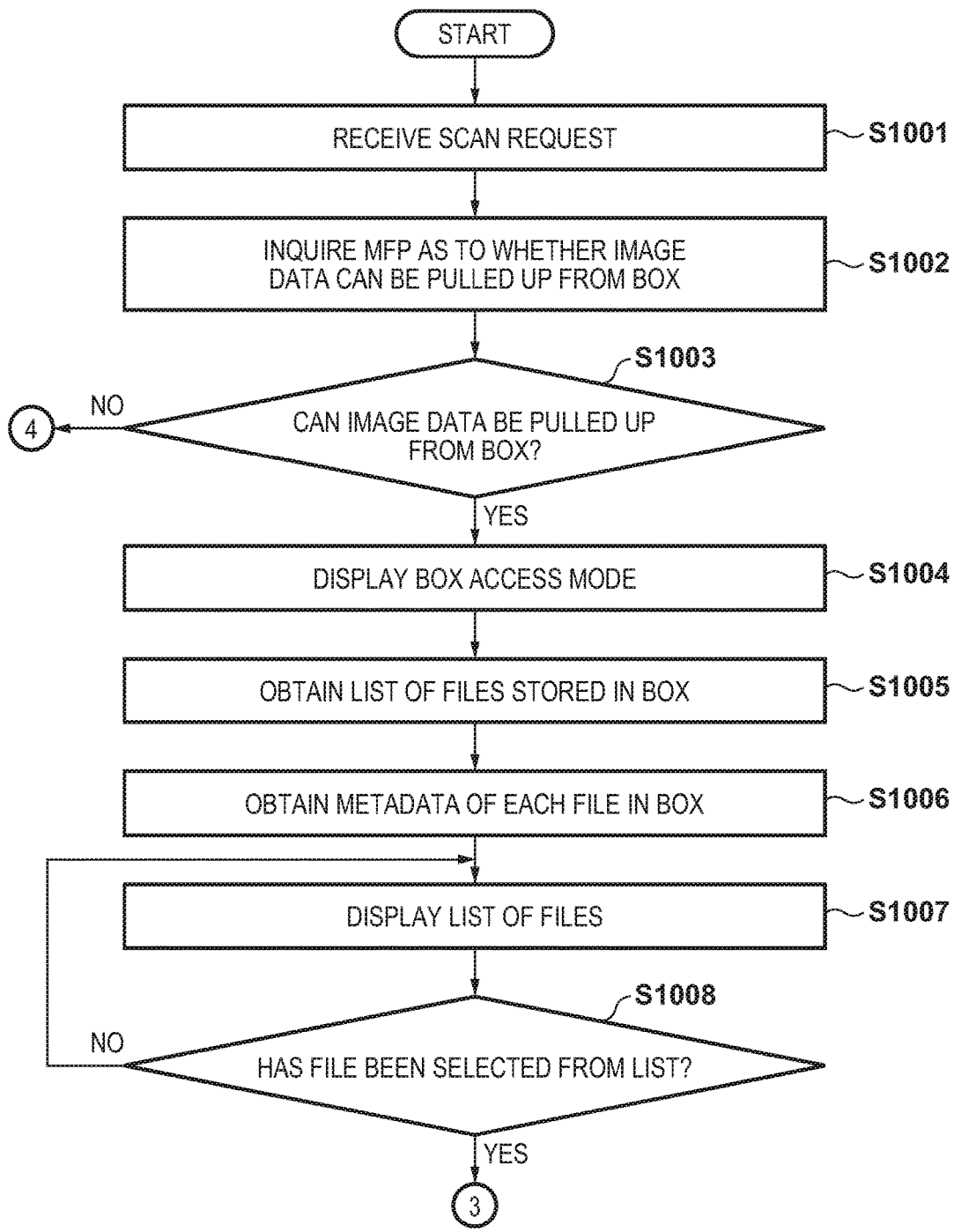

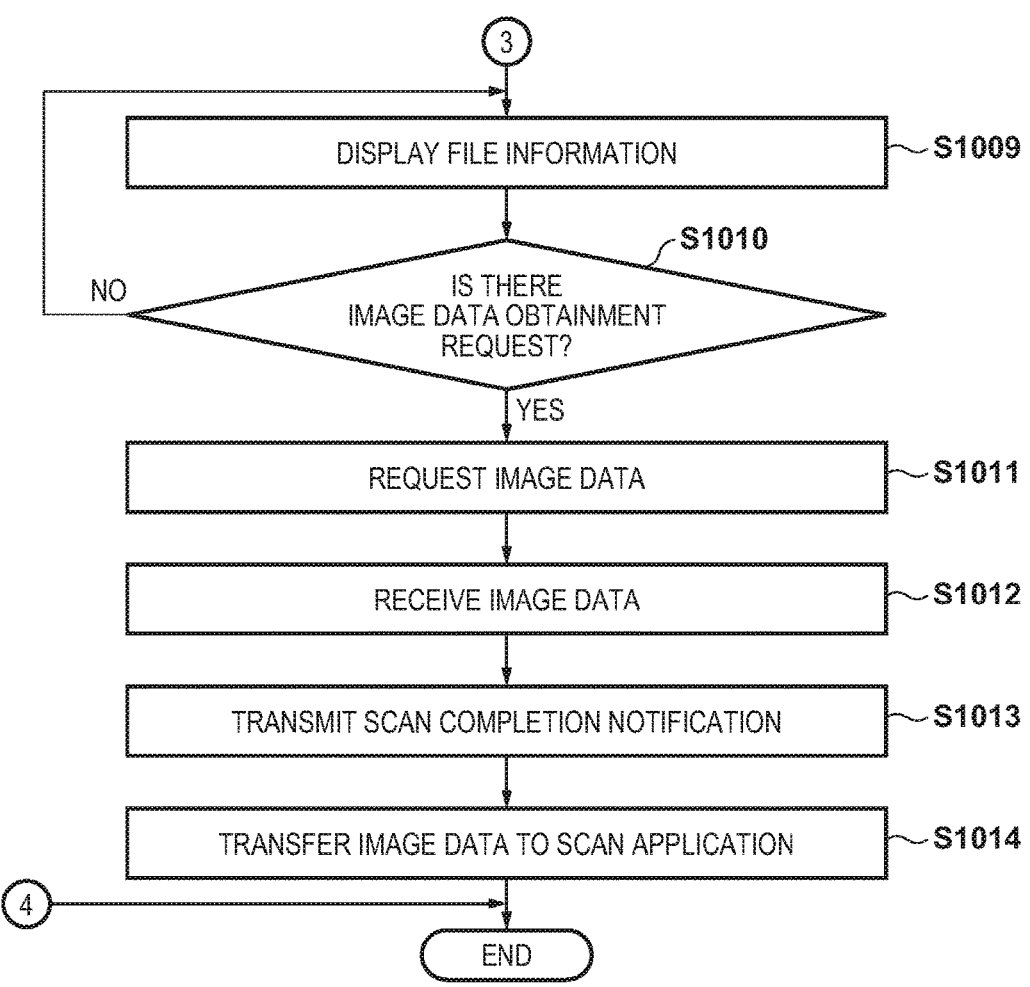

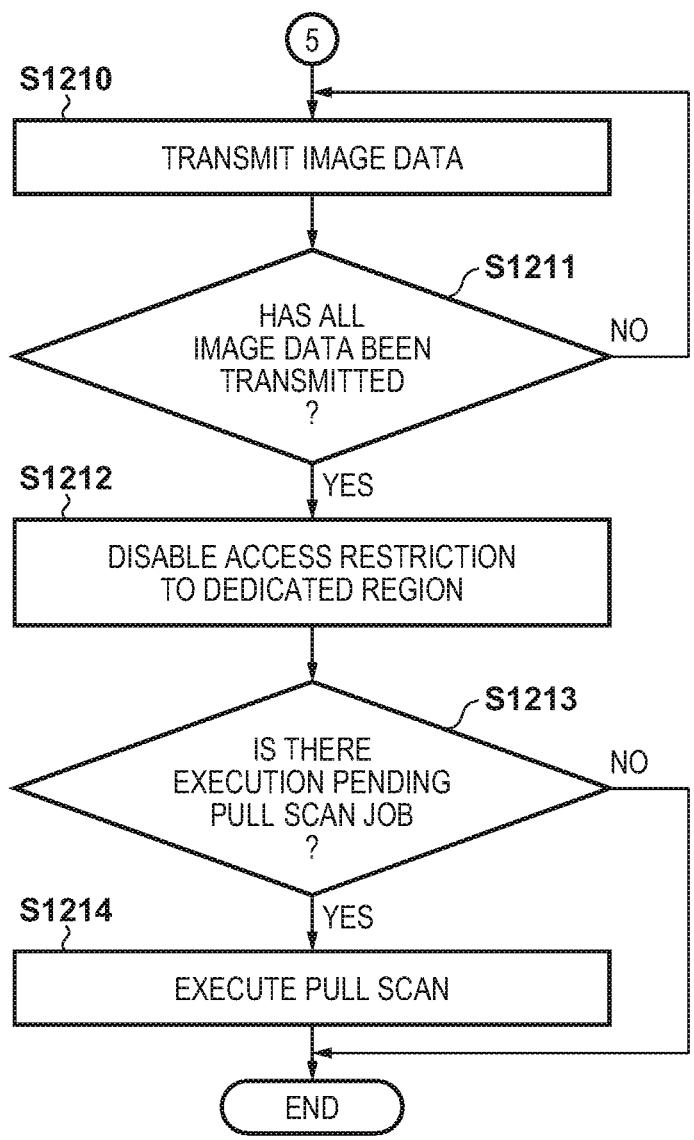

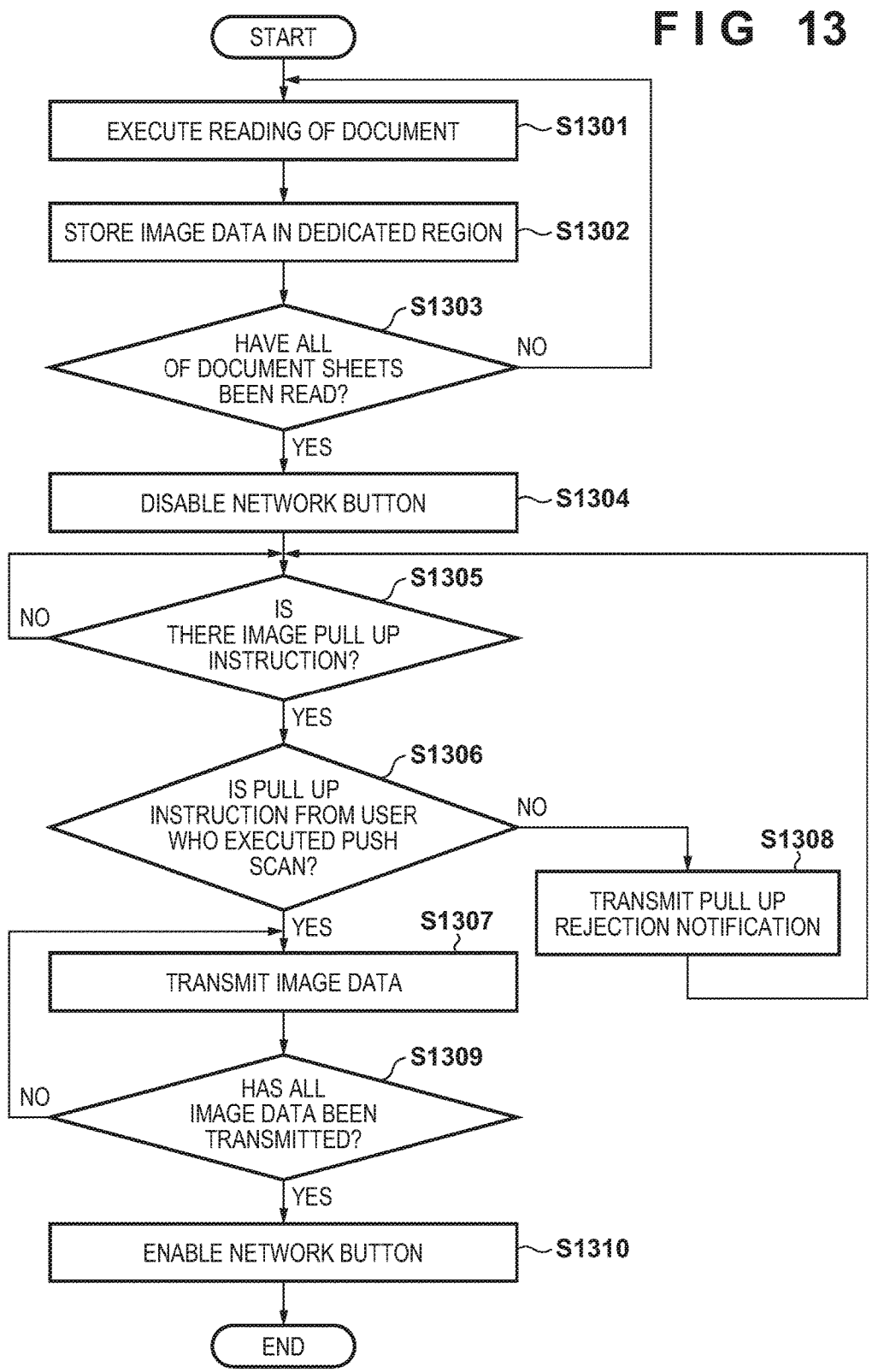

IMAGE READING SYSTEM IN WHICH AN APPARATUS ACCEPTS AN INSTRUCTION TO START READING A DOCUMENT BY USING SETTING INFORMATION IN A SCAN JOB RECEIVED FROM AN INFORMATION PROCESSING APPARATUS, IMAGE READING APPARATUS, AND IMAGE READING METHOD OF IMAGE READING SYSTEM

BACKGROUND OF THE INVENTION

Field of the Invention

The present invention relates to an image reading system, an image reading apparatus, and an image reading method of the image reading system.

Description of the Related Art

Conventionally, between an image reading apparatus and a personal computer (to be referred to as a PC hereinafter) that are connected to a network, there is known a function to directly load, via a scanner driver on the PC side, image data read by the image reading apparatus to an application on the PC side. Japanese Patent Laid-Open No. 2005-277564 discloses that this function is called a pull scan (a network scan or a remote scan).

In a pull scan, a user first sets a reading-target document on the image reading apparatus, returns to the location of the PC, and instructs the execution of the scan by using the PC. After the execution of the scan has been instructed, the PC transmits a scan execution instruction to the image reading apparatus. The PC receives image data that has been generated by the image reading apparatus by scanning the document in accordance with the execution instruction. Subsequently, the user goes to the location of the image reading apparatus again and collects the read document. In this case, since the user must temporarily leave the location of the image reading apparatus on which the document has been set, there is a possibility that a third party may erroneously take the document set on the image reading apparatus during this period.

SUMMARY OF THE INVENTION

An aspect of the present invention is to eliminate the above-mentioned problem with conventional technology.

According to a first aspect of the present invention, there is provided an image reading system that includes an image reading apparatus and an information processing apparatus, wherein the image reading apparatus comprising: a first memory storing a set of instructions; and one or more first processors that execute instructions of the set of the instructions and cause the image reading apparatus to function as: a first reception unit configured to receive, from the information processing apparatus, a scan job which includes setting information used to read a document; an accepting unit configured to accept a user instruction for instruction to start reading of the document by using the setting information included in the scan job received by the first reception unit; a reading unit configured to cause a reader to read the document and execute the scan job in accordance with the user instruction accepted by the accepting unit; and a first transmission unit configured to transmit an execution status of the scan job received by the first reception unit to the information processing apparatus, wherein the first reception unit further receives, from the information processing apparatus, a request for image data generated by reading the document by the reader, and wherein the first transmission unit transmits the image data to the information processing apparatus in accordance with the received request, wherein the information processing apparatus comprising: a second memory storing a set of instructions; and one or more second processors that execute instructions of the set of the instructions and cause the information processing apparatus to function as: a second transmission unit configured to transmit the scan job which includes the setting information used for the reading of the document by the reader; and a second reception unit configured to receive the execution status of the scan job transmitted by the first transmission unit, wherein the second transmission unit further transmits the request to the image reading apparatus in accordance with the execution status of the scan job received by the second reception unit, and wherein the second reception unit further receives the image data transmitted from the first transmission unit.

According to a second aspect of the present invention, there is provided an image reading apparatus comprising: a memory storing a set of instructions; and one or more processors that execute instructions of the set of the instructions and cause the image reading apparatus to function as: a reception unit configured to receive, from an information processing apparatus, a scan job which includes setting information used to read a document; an accepting unit configured to accept an user instruction for instructing to start reading of the document by using the setting information included in the scan job received by the reception unit; a reading unit configured to cause a reader to read the document by accepting the user instruction by the accepting unit; and a transmission unit configured to transmit an execution status of the scan job to the information processing apparatus, wherein the reception unit further receives an image data obtainment request from the information processing apparatus which received the execution status of the scan job transmitted by the transmission unit, and wherein the transmission unit further transmits, to the information apparatus, the image data obtained by reading the document by the reader in accordance with the image data obtainment request.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart for describing push scan processing performed by the scanner driver of the PC according to the first embodiment;

FIGS. 9A and 9B are flowcharts for describing push scan processing performed by the MFP according to the first embodiment;

FIGS. 10A and 10B are flowcharts for describing processing performed by a PC to load image data stored in a box in an MFP into the PC according to the second embodiment;

FIGS. 12A and 12B are flowcharts for describing push scan processing performed by an MFP according to the third embodiment; and FIG. 13 is a flowchart for describing push scan processing performed by an MFP according to the fourth embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
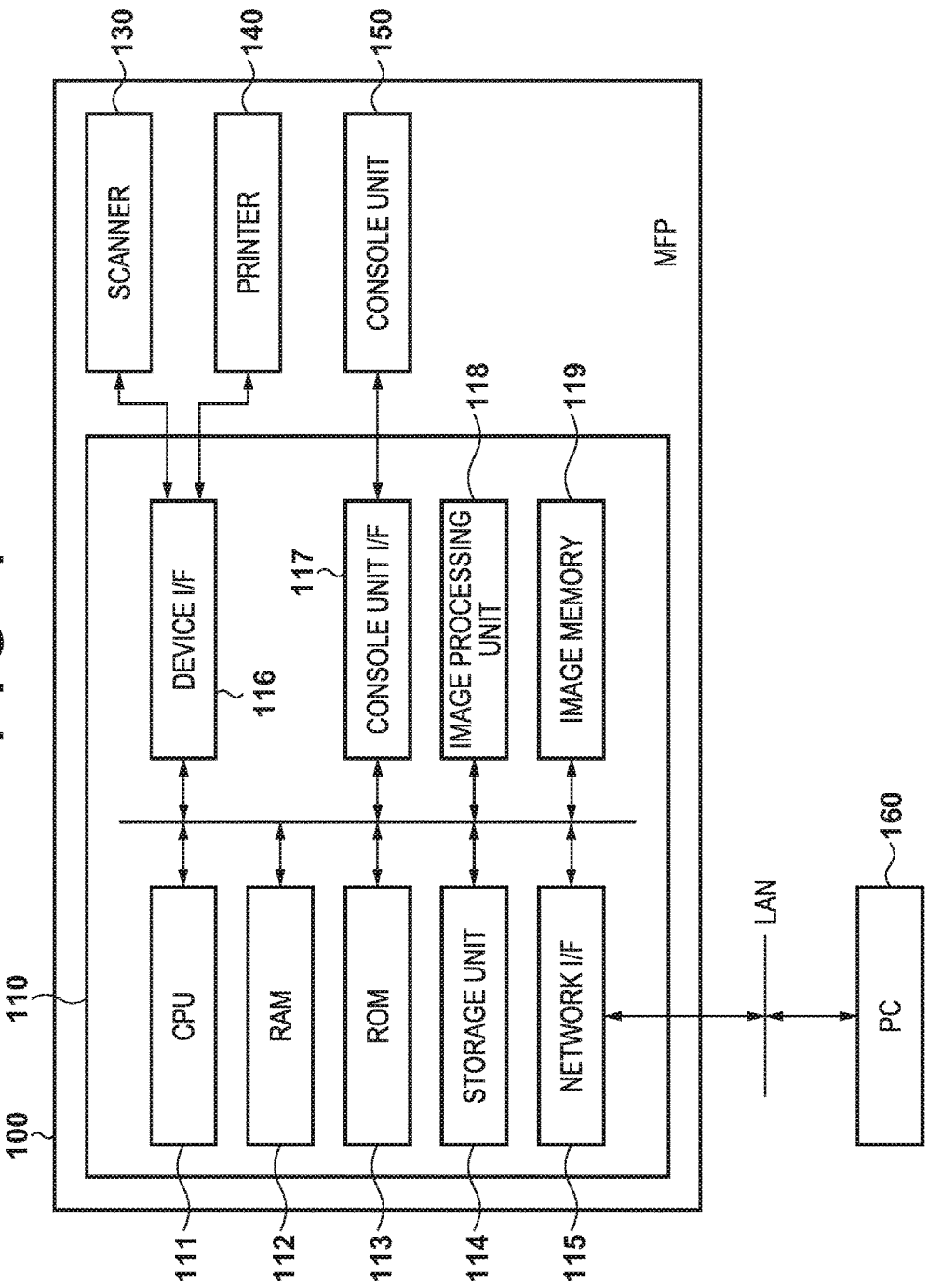
FIG. 1 is a block diagram for explaining the arrangement of a multi-function peripheral (MFP) that functions as an image reading apparatus according to the first embodiment.

FIG. 1 is a block diagram for explaining the arrangement of a multi-function peripheral (MFP) 100 that functions as an image reading apparatus according to the first embodiment described in this specification.

A control unit 110 is connected to a scanner 130, which is an image input device configured to read a document and input image data, and to a printer 140, which is an image output device configured to print an image based on image data, and controls input and output of image data between the devices. On the other hand, the control unit 110 is connected to a LAN and receives a print job from a PC 160 or the like via the LAN. A console unit 150 includes a display unit and a keyboard and accepts user operation. The display unit may have a touch panel function, and a user operation is accepted through this touch panel in this case.

Here, by a user instruction, the MFP 100 can execute a pull scan or a push scan in which the image data from a document read and obtained by the scanner 130 is transmitted to the PC 160 as an information processing apparatus. The MFP 100 and the PC 160 can communicate with each other via the LAN and form an information processing system by being connected to a device, a printer, an information terminal, a PC and the like (all not shown) via the LAN. Note that the connection of these devices is not limited to a wired connection and may also be a wireless connection. Here, assume that the MFP 100 and the PC 160 are apart from each other by, for example, several tens of meters.

The arrangement of the control unit 110 will be described next.

A CPU 111 executes a boot program stored in a ROM 113, deploys a program stored in a storage unit 114 to a RAM 112, executes the deployed program, and controls the operation of the MFP 100. The ROM 113 is a boot ROM and stores the boot program and various kinds of setting information. The storage unit 114 stores system software, image data, programs for controlling the operation of the MFP 100, and the like. A network I/F 115 is connected to the LAN and controls input/output of various kinds of information by communicating with an external apparatus such as the PC 160 via a network. A device I/F 116 connects the scanner 130, the printer 140, and the control unit 110 to each other and converts between synchronous and asynchronous image data. A console unit I/F 117 is an interface connecting the console unit 150 and the control unit 110 and outputs, to the console unit 150, image data to be displayed on the console unit 150. The console unit I/F 117 also transmits, to the CPU 111, information input by a user via the console unit 150. An image processing unit 118 performs image processing on print data received via the LAN and on image data input to and output from the device I/F 116. An image memory 119 is a memory used to temporarily render image data which is to be processed by the image processing unit 118.

Figure 2:
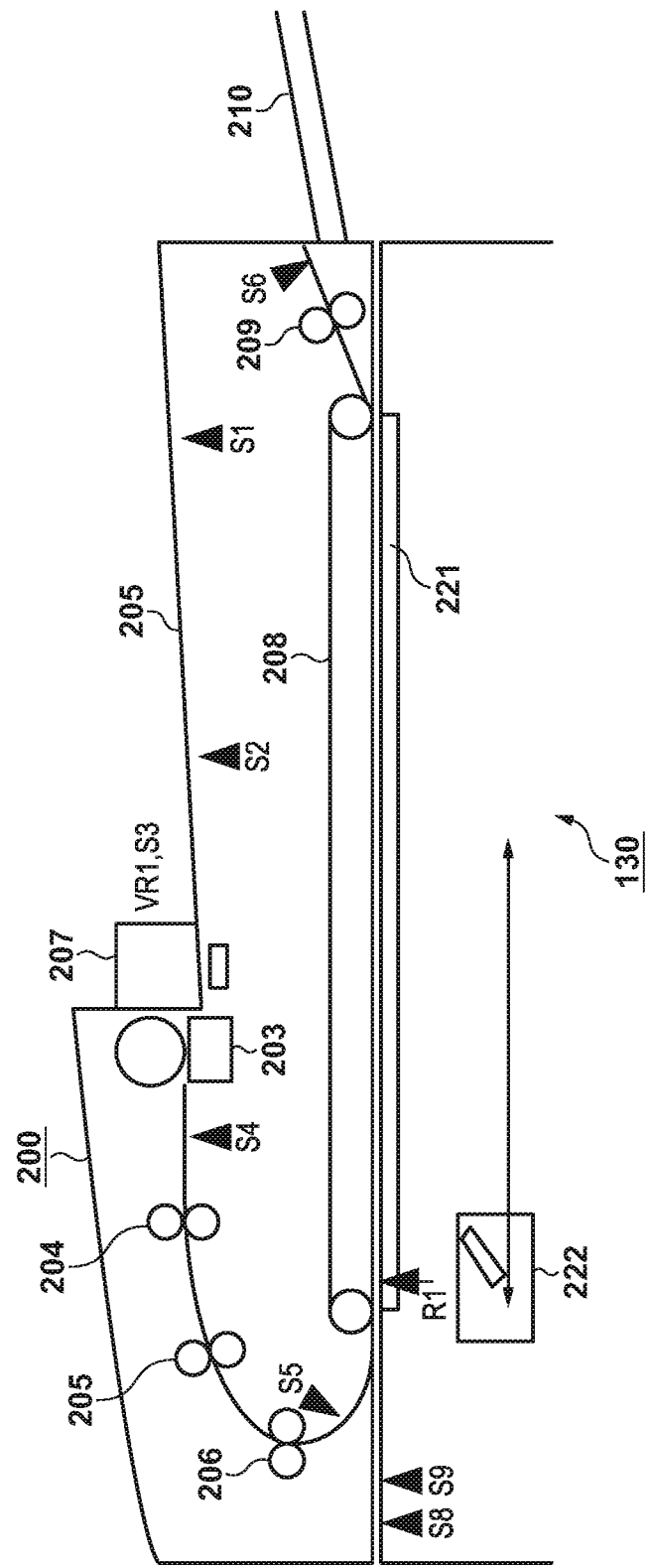
FIG. 2 depicts a sectional view of a structure for explaining the arrangement of a scanner according to the first embodiment.

FIG. 2 depicts a sectional view of a structure for explaining the arrangement of the scanner 130 according to the first embodiment.

The scanner 130 includes a document feeder 200. A document placed on a document tray 205 is drawn into a separation unit 203 by a feeding unit of the document feeder 200, each topmost sheet of the document bundle is separated and conveyed to conveyance rollers 204 and 205. A registration roller 206 is not rotating at the time of the arrival of the leading edge of the document and conveys the document to a reading unit after forming a loop by the conveyance of the document by the rotation of the conveyance rollers 204 and 205 and performing skew correction of the document. The reading unit conveys the document, which was conveyed by the aforementioned feeding unit, to a position R1 by the registration roller 206 and the reading belt 208 at a predetermined speed. When the leading edge of the document arrives at the reading position R1, a reading operation is performed by performing an operation to expose the document at the reading position R1 by a fixed optical unit 222 and conveying the document. This reading method is referred to as a flow-reading mode.

On the other hand, it is also possible to perform the reading operation by stopping the document when the trailing edge of the document arrives at the reading position R1, performing scanning by exposing the document by the optical unit 222, and further moving the optical unit 222 in the sub-scanning direction. This reading method is called a fixed-reading mode. When the reading of the document is completed in this manner, the document is conveyed to the document discharge unit by the reading belt 208. The document discharge unit discharges the document to a discharge tray 210 by the rotation of a discharge roller 209. Note that various sensors S1 to S6 and VR1 are arranged in the document feeder 200 in FIG. 2.

The large-size detection sensor S1 and the small-size detection sensor S2 that detect the length of the document have been provided on the document tray 205. In a document width guide 207, the width detection volume VR1 and the width detection sensor S3 (both not shown) have also been provided. Also, the size detection sensor S4 that measures the length of a document in addition to detecting the document to be separated and fed by detecting the leading edge and the trailing edge of the document, and the read sensor S5 that detects the leading edge of the document and make a notification of a reading signal are provided on the document conveyance path. Furthermore, the discharge sensor S6 and a document set sensor (not shown) that determines whether a document (not shown) has been set on the document tray 205 have been provided.

Open/close sensors S8 and S9 that detect the opening and closing angles of the document feeder 200 are arranged on the scanner 130. When a document is placed on a platen glass 221 by the user, the size of the document placed on the platen glass 221 is specified by the open/close sensors S8 and S9, the size sensor (not shown), and the exposure operation. Note that when the document is placed on the platen glass 221 by the user, the document is read in the same manner as the fixed-reading mode by scanning and exposing the document by the optical unit 222 while moving the optical unit 222. This method is a well-known technique, and a detailed explanation thereof will be omitted.

Figure 3:
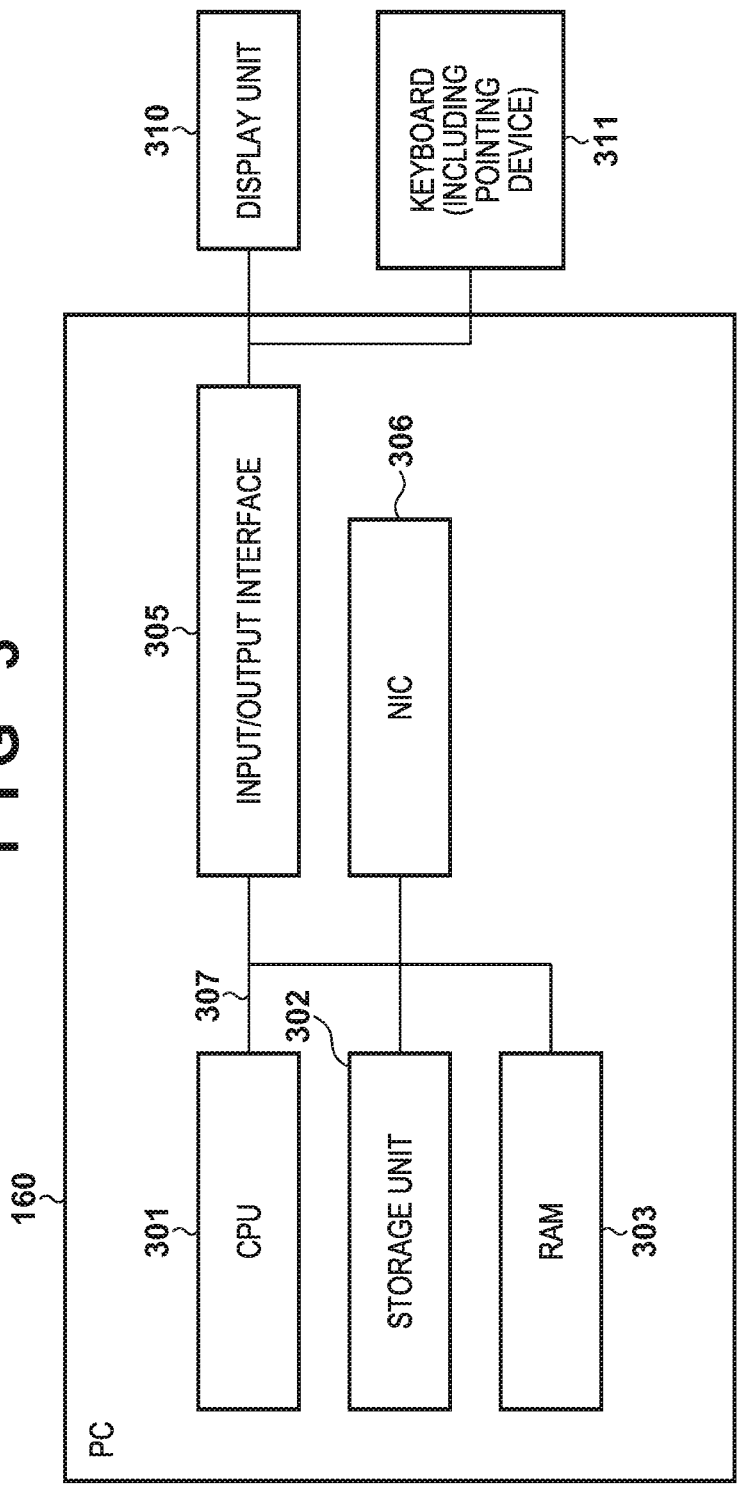
FIG. 3 is a block diagram for explaining the hardware arrangement of a PC according to the first embodiment.

FIG. 3 is a block diagram for explaining the hardware arrangement of the PC 160 according to the first embodiment.

A CPU 301 deploys, on a RAM 303, various kinds of programs stored in a storage unit 302 and executes various kinds of processing by executing corresponding programs to implement various functions. The storage unit 302 stores various kinds of programs and setting data. The RAM 303 provides a deployment area for programs executed by the CPU 301 as well as a temporary work area for the CPU 301. An input/output interface 305 transmits data to a display unit 310 connected to this PC 160 and receives data from a keyboard and pointing device 311. A NIC (Network Interface Card) 306 connects the PC 160 to the network and controls the interfaces with the network. Each unit described above is connected to the CPU 301 via a bus 307 and exchanges data, control signals, and addresses via the bus 307. Note that the display unit 310 may have a touch panel function.

Figure 4:
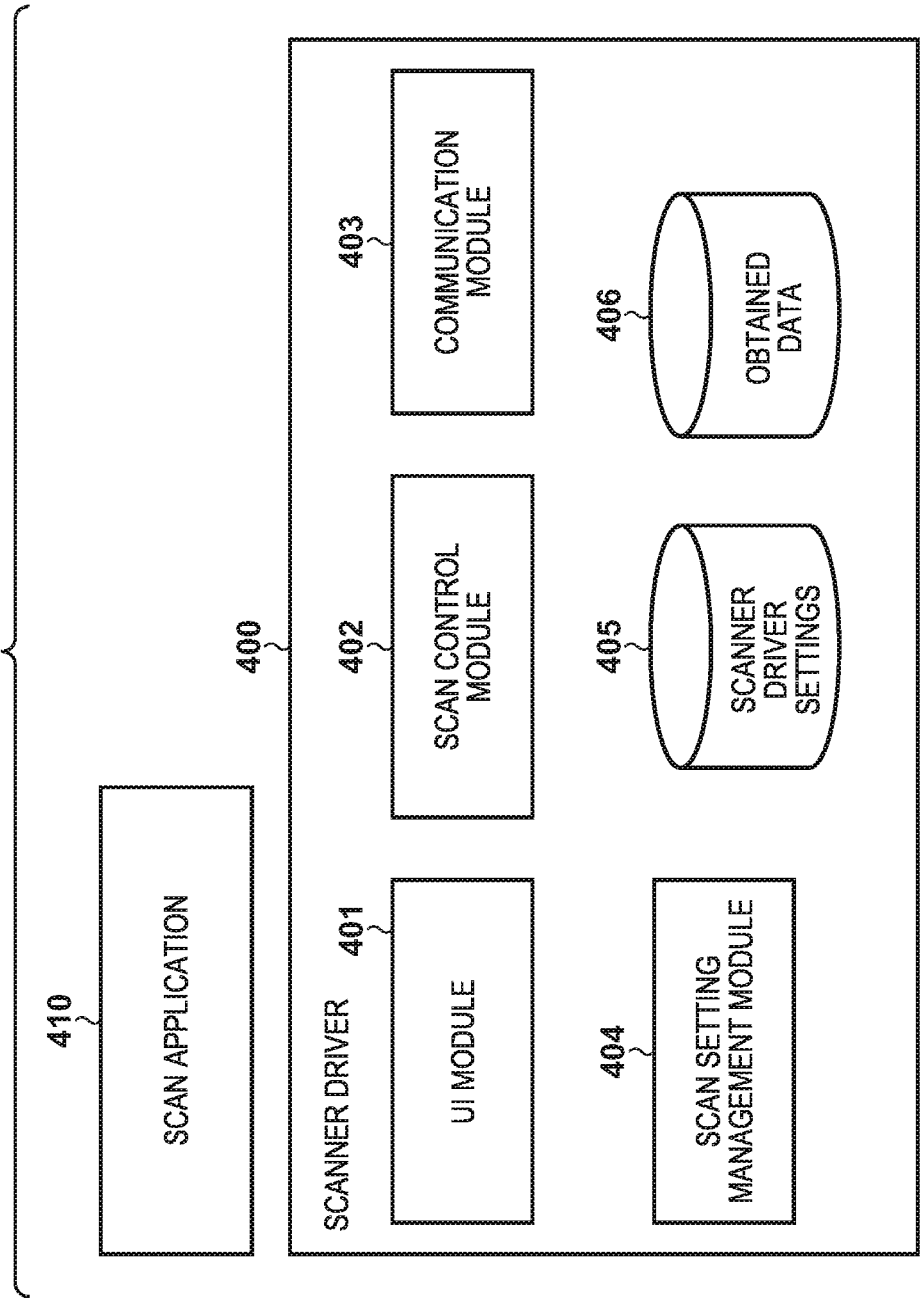
FIG. 4 is a functional block diagram for explaining the functions implemented by software operating on the PC according to the first embodiment.

FIG. 4 is a functional block diagram for explaining the functions implemented by software operating on the PC 160 according to the first embodiment. A program corresponding to this software is stored in the storage unit 302, and each function shown in the block diagram is implemented by the CPU 301 deploying and executing a program on the RAM 303.

A scan application 410 is installed in the PC 160 and has a function by which image data such as a photograph, a document, or the like is obtained by accessing the MFP 100 via a scanner driver 400. The scanner driver 400 is a scanner driver complying with a predetermined API (Application Program Interface) standard such as TWAIN (Tool Without An Interesting Name). The scanner driver 400 communicates with the MFP 100 in response to a request from the scan application 410 and has a function by which image data obtained by scanning a document using the scanner 130 of the MFP 100 or image data stored in the storage unit 114 of the MFP 100 is obtained. The scan application 410 receives the image data obtained by the scanner driver 400.

The scanner driver 400 includes a UI module 401, a scan control module 402, a communication module 403, a scan setting management module 404, scanner driver settings 405, and obtained data 406. The UI module 401 provides a user interface related to the scan settings of the scanner driver 400. The scan control module 402 executes scanning or image data obtainment processing in accordance with the designated scan setting. The communication module 403 communicates with the MFP 100 by using the NIC 306. The scan setting management module 404 presents, via the UI module 401, a scan setting screen to the user and manages the setting information related to the execution of the scan. The scanner driver settings 405 are pieces of setting information that are to be stored in the storage unit 302 and saved by the scan setting management module 404. The obtained data 406 is the list information of data obtained from the MFP 100 and is referred to and updated when a scan is executed by the scan control module 402.

Figure 5:
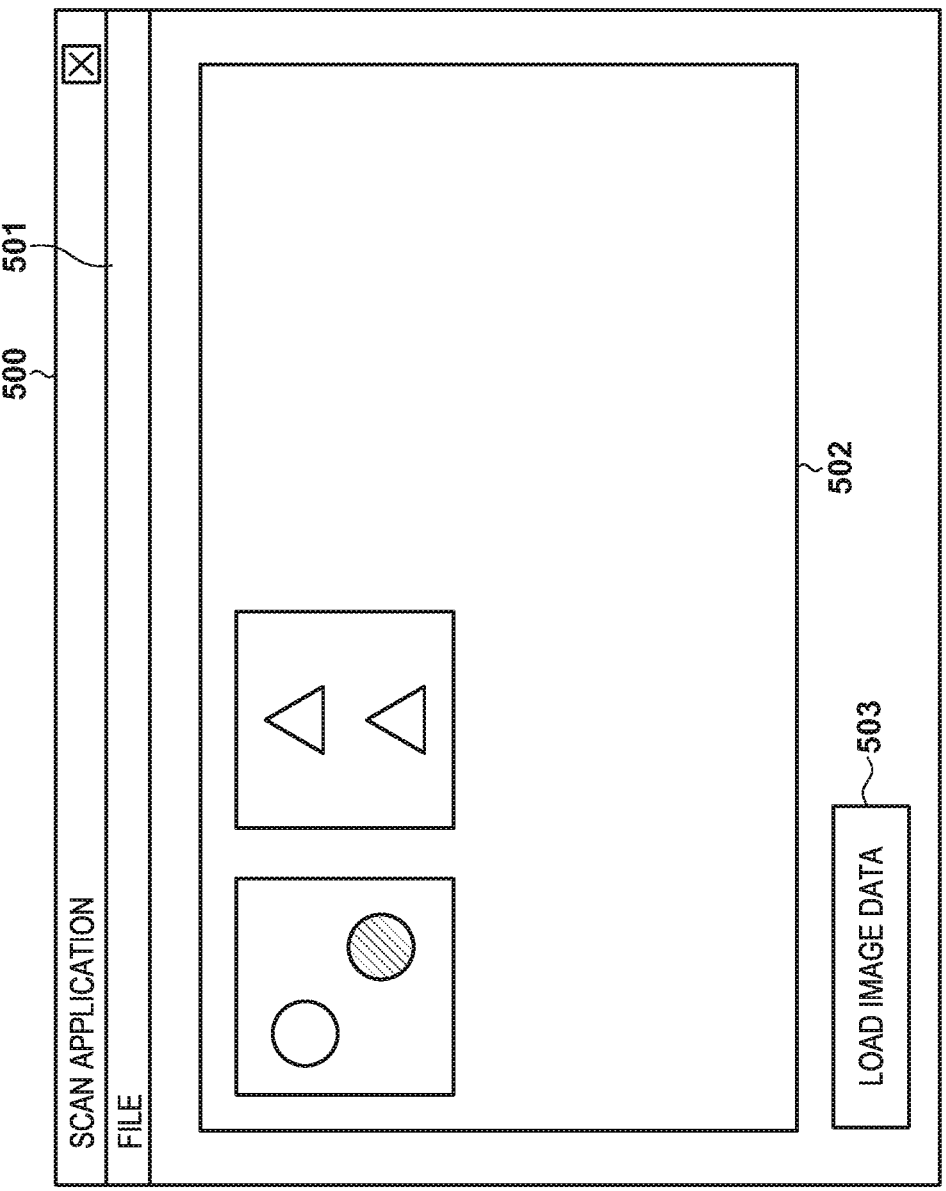
FIG. 5 depicts a view showing an example of a UI screen displayed by a scan application and a scanner driver of the PC according to the first embodiment.

FIG. 5 depicts a view showing an example of a UI screen displayed by the scanner driver 400 and the scan application 410 of the PC 160 according to the first embodiment.

FIG. 5 shows an example of a UI screen 500 displayed by the scan application 410. This UI screen 500 includes a menu 501, an image data display region 502, and an image data loading button 503. The menu 501 displays various kinds of settings for the scan application 410 and a UI screen to select a scanner driver which is to be an image loading target. The image data display region 502 displays a list of image data obtained by the scan application 410. The image data loading button 503 issues an image data obtainment request by a predetermined API to the scanner driver selected on the menu 501.

A general pull scan will be described next with reference to FIG. 6.

Figure 6:
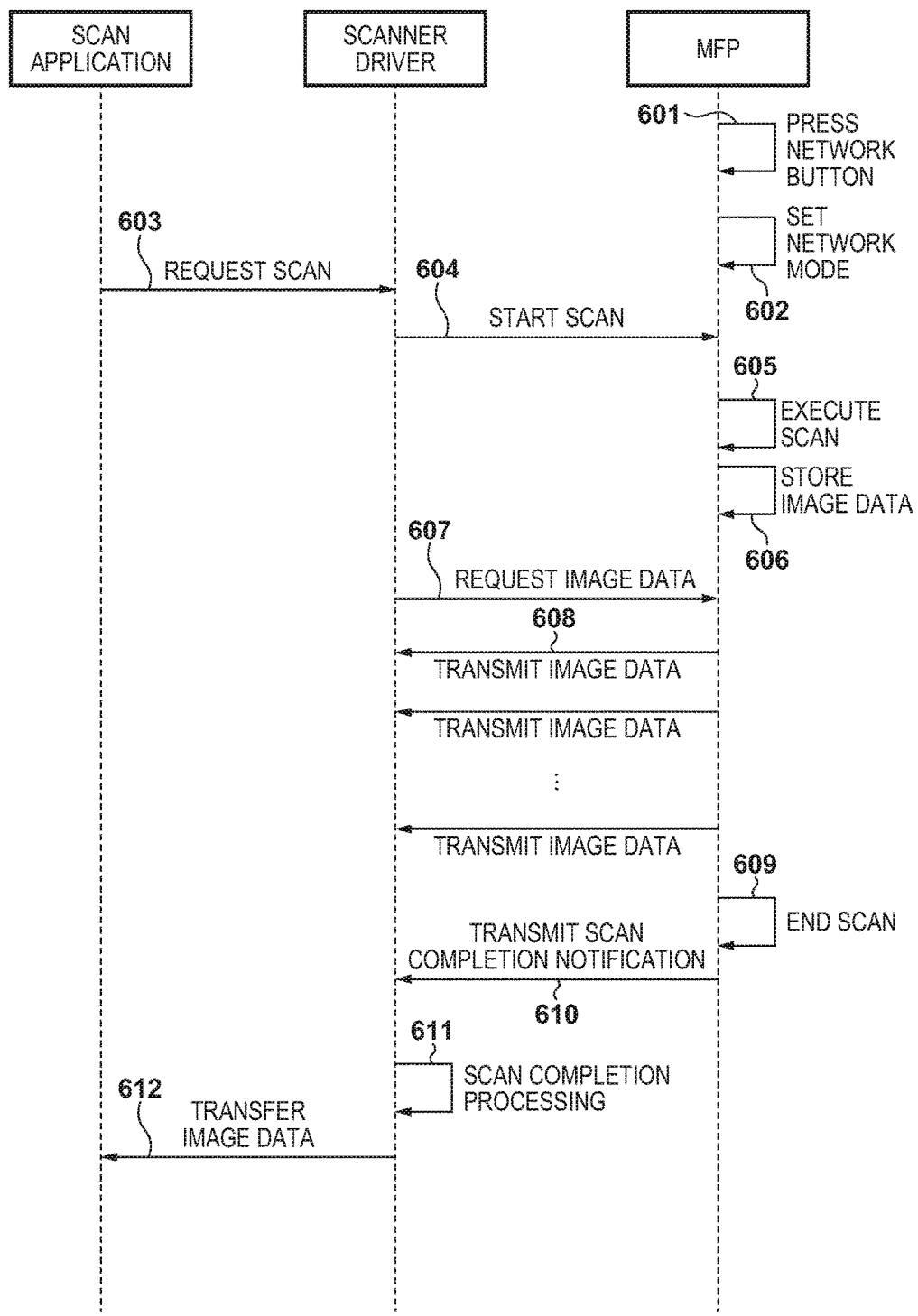
FIG. 6 is a sequence chart for explaining a pull scan between the PC and a general MFP.

FIG. 6 is a sequence chart for explaining a general pull scan between a general MFP and a PC. Here, an example in which the PC makes a pull-scan request to the MFP and the MFP reads a document in response to the request and transmits the obtained image data to the PC will be described.

In 601, the user presses the network button on the console unit of the MFP. Accordingly, in 602, the MFP shifts to a network mode which allows the execution of a pull scan. The user places a document on the scanner of the MFP and moves to the location where the PC has been placed.

In 603, the user activates the scanner driver by activating the scan application in the PC. In 604, a scan start instruction is transmitted from the PC to the MFP.

The MFP set to the network mode receives, in 605, the scan start instruction transmitted from the PC and executes the reading (scanning) of set document. In 606, the image data obtained by the scan is stored in the storage unit of the MFP.

On the other hand, after transmitting a scan start instruction in 604, the scanner driver of the PC periodically transmits an image data request to the MFP in 607. Accordingly, in 608, the MFP responds to the image data request from the scanner driver and transfers the image data stored in the storage unit to the PC.

Upon detecting that the document has run out in the scanner in 609, the MFP transmits a scan completion notification to the scanner driver in 610.

As a result, the scanner driver executes, in 611, the scan completion processing in response to the scan completion notification and transfers, in 612, the image data transferred from the MFP to the scan application.

In this sequence, the user needs to move to the location where the PC has been placed after he/she has set the document on the scanner of the MFP. Hence, it temporarily creates a state in which the document may be seen by another person.

An operation (to be referred to as a push scan hereinafter) to load image data, which has been obtained by scanning a document without the user having to leave the document, by the PC scan application will be described next as a feature of the first embodiment.

Figure 7:
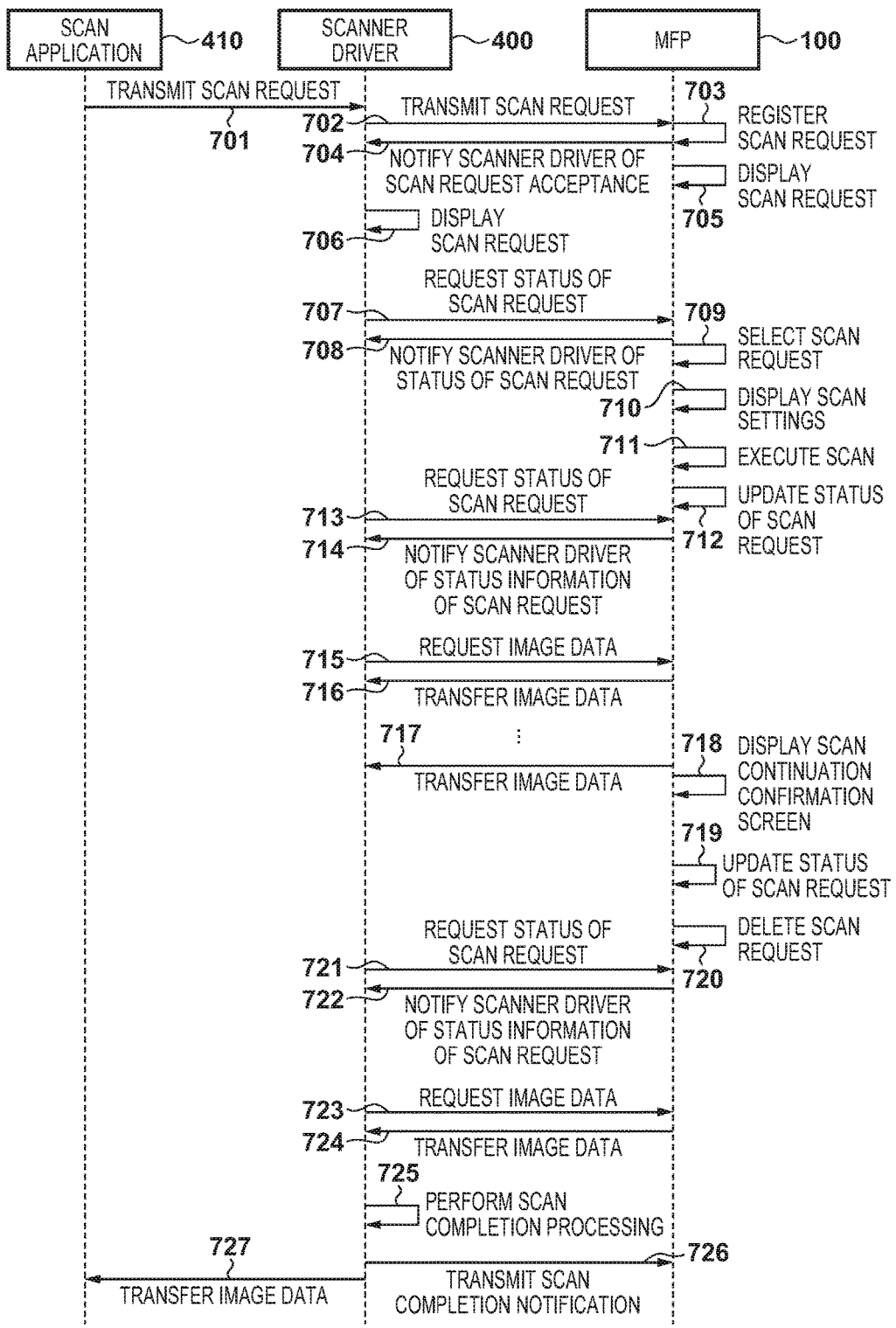
FIG. 7 is a sequence chart for explaining a push scan between the PC and the MFP according to the first embodiment.

FIG. 7 is a sequence chart for explaining a push scan performed between the MFP 100 and the PC 160 according to the first embodiment.

The user activates the scanner driver 400 by activating the scan application 410 by the PC 160 and transmits, in 701 and 702, a scan request from the PC 160 to the MFP 100. Here, the scan request is a scan job that includes settings (reading resolution, reading color mode, and the like) for scanning.

Upon receiving this scan request, the MFP 100 registers, in 703, the scan request and transmits, in 704, a reception notification indicating the reception of the scan request to the scanner driver 400. In 705, the MFP 100 displays the scan request received from the PC 160 on the console unit 150. Also, upon receiving the reception notification of the scan request, the scanner driver 400 displays, in 706, a scan standby dialogue on the display unit of the PC 160. Next, in 707, the scanner driver 400 periodically transmits a request to the MFP 100 for information of the status of the scan request transmitted to the MFP 100 and receives, in 708, the status of the scan request from the MFP 100. During this period, the user takes the reading target document and moves from the location of the PC 160 to the location of the MFP 100.

In 709, having arrived at the location of the MFP 100, the user selects the scan request he/she wants to execute from the scan request list displayed on the console unit 150 of the MFP 100. In 710, the MFP 100 displays, on the console unit 150, the scan settings of the scan request selected by the user. After confirming the displayed scan settings and setting the document on the scanner 130, the user presses the scan execution button. Accordingly, in 711, the MFP 100 starts the reading processing of the document which has been placed on the scanner 130 and stores the image data obtained from the scanning of the document in the storage unit 114. At this time, the MFP 100 executes the scanning operation until all of the document sheets set on the scanner 130 have been read.

After the scanning operation is started in this manner, the MFP 100 updates the status information of the scan request to "scanning" in 712. The MFP responds, in 713, to the request from the scanner driver 400 of the PC 160 for the scan-request status information and transmits, in 714, the current status ("scanning" in this case) of the scan request to the PC 160. Accordingly, in 715, the scanner driver 400 detects that the status information of the scan request transmitted in 702 has been changed to "scanning" and transmits an image data request (scan data request). As a result, in 716, the MFP 100 responds to the image data request by reading out the image data stored in the storage unit 114 and transmitting the image data to the scanner driver 400 of PC 160. In 717, this image data transmission is repetitively executed until the image data of all of the document sheets corresponding to the scan request has been transmitted.

In this manner, in 718, after reading all of the document sheets set in the scanner 130, the MFP 100 displays on the console unit 150 a screen to make the user confirm whether or not to continue the execution of the scanning operation. Here, if the execution of the scanning operation is to be continued, the user sets the next document on the scanner 130 and presses the scan start button. Otherwise, the user presses the scan complete button. Here, when the user presses the scan complete button, the status information of the scan request is changed to "scan complete" in 719, and the scan request that had been displayed on the console unit 150 is deleted in 720. The MFP responds to the request for the status information of the scan request which it receives from the scanner driver 400 of the PC 160 in 721, and transmits the status ("scan complete" in this case) of the request to the PC 160 in 722. As a result, the scanner driver 400 transmits an image data transfer request in 723. When the transfer of the image data is completed in 724, the scanner driver 400 stops the display of the scan standby dialogue and ends the scan processing in 725. In 726, the scanner driver 400 notifies the MFP 100 of the completion of the scan. In 727, the scanner driver 400 transfers, to the scan application 410, the image data received from the MFP 100 and ends this processing.

As described above, in the first embodiment, the user takes the document to the location of the MFP after activating the scan application from the PC, sets the document on the MFP, and causes the MFP to read the document. Since the image data is automatically transmitted from the MFP to the PC, the user can execute the push scan from the MFP to PC without leaving the location of the document.

FIG. 8 is a flowchart for describing the push scan processing performed by the scanner driver 400 of the PC 160 according to the first embodiment. Note that although the processing shown in this flowchart is implemented by the CPU 301 deploying and executing a program on the RAM 303, it will be described as processing performed by the scanner driver 400 of FIG. 4 here.

First, in step S801, the scanner driver 400 receives a scan request from the scan application 410. Next, the process advances to step S802, and the scanner driver 400 transmits the scan request to the MFP 100. Next, the process advances to step S803, and the scanner driver 400 determines whether or not it has received a registration completion notification of this scan request from the MFP 100. When the scanner driver receives the registration completion notification, the process advances to step S804. In step S804, the scanner driver 400 displays the scan standby dialogue on the display unit 310 of the PC 160.

Next, the process advances to step S805, and the scanner driver 400 transmits a request for the status of the scan request to the MFP 100. In step S806, the scanner driver 400 receives the status information of the scan request from the MFP 100. The process advances to step S807, and the scanner driver 400 determines whether the status indicates "scanning". Here, if the status does not indicate "scanning", the process returns to step S805. Otherwise, the process advances to step S808. In step S808, the scanner driver 400 transmits a request to the MFP 100 for the image data obtained from the reading of the document by the scan. In step S809, the scanner driver 400 receives the image data transmitted from the MFP 100 as a response to the request and stores the received image data in the storage unit 302. Next, the process advances to step S810, and the scanner driver 400 transmits a request for the status of the scan request to the MFP 100, and the scanner driver 400 receives, from the MFP 100, the status information transmitted in response to the status request in step S811. In step S812, the scanner driver 400 determines whether or not the received status information indicates "scan complete". If the scanner driver determines that the status does not indicate "scan complete", the process advances to step S808, and the scanner driver 400 continues to receive the image data obtained by the scan until the scanning ends. When the reading of the document in the MFP 100 has ended and the status information has changed to "scan complete", the process advances from step S812 to step S813.

In step S813, the scanner driver 400 transmits an image data request to the MFP 100. In step S814, the scanner driver 400 receives the image data in response to the request and saves the received image data in the storage unit 302. Next, the process advances to step S815, and the scanner driver 400 stops display of the scan standby dialogue that had been displayed on the display unit 310 of the PC 160. Next, the process advances to step S816, and the scanner driver 400 executes the scan completion processing. The process then advances to step S817, and the scanner driver 400 transmits the scan completion notification to the MFP 100. Subsequently, the process advances to step S818, and the scanner driver 400 transfers, to the scan application 410, all of the image data stored in the storage unit 302 by this scan request and ends the processing.

In this manner, the user can make the MFP read the document after activating the scan application on the PC 160, and the image data obtained by reading the document is automatically transmitted from the MFP 100 to the PC 160.

FIGS. 9A and 9B are flowcharts for describing the push scan processing performed by the MFP 100 according to the first embodiment. Note that the processing shown in this flowchart is implemented by the CPU 111 executing a program deployed from the storage unit 114 to the RAM 112.

First, in step S901, the CPU 111 receives a scan request from the PC 160, and the process advances to step S902. The CPU 111 registers the received scan request in a scan request list. Next, the process advances to step S903, and the CPU 111 transmits, to the scanner driver 400 of the PC 160, a scan request reception notification indicating that the scan request has been received and registered in the MFP 100.

Next, the process advances to step S904, and the CPU 111 displays the scan request list on the console unit 150, and the CPU 111 determines, in step S905, whether or not a scan request has been selected by the user via the console unit 150. Here, if the scan request has not been selected, the process advances to step S904. Otherwise, the process advances to step S906. In step S906, the CPU 111 displays the scan settings of the selected scan request on the console unit 150. Next, the process advances to step S907, and the CPU 111 determines whether or not scan execution has been instructed by the user via the console unit 150. Here, if it is determined that the execution of a scan has been instructed, the process advances to step S908. Otherwise, the process returns to step S906.

In step S908, the CPU 111 updates the status of the scan request to "scanning", notifies the status to the PC 160, and advances the process to step S909. The CPU 111 controls the scanner 130 to execute the reading of the document. Next, the CPU receives the image data obtained by causing the scanner 130 to read the document and stores the received image data in the storage unit 114. In step S910, the CPU 111 determines whether or not all of the document sheets placed on the scanner 130 have been read. If it is determined that all of the document sheets have been read, the process advances to step S913. Otherwise, the process advances to step S911. In step S911, the CPU 111 determines whether or not it has received an image data request from the PC 160. If the CPU determines that it has received the image data request, the process advances to step S912. Otherwise, the process advances to step S909. In step S912, the CPU 111 reads out the image data that it had obtained from the scanner 130 and had been stored in the storage unit 114 and transmits the image data to the scanner driver 400 of the PC 160. This process is repetitively executed until all of the document sheets placed on the scanner 130 have been read.

When the reading of all of the document sheets has been completed, the process advances to step S913 and the CPU 111 determines whether or not there is an image data request from the PC 160. If it is determined that there is the image data request from the PC 160, the process advances to step S914, and the image data is transmitted to the PC 160. On the other hand, if it is determined that there is no image data request in step S913, the process advances to step S915. In step S915, the CPU 111 displays a screen on the console unit 150 to confirm, with the user, as to whether or not the scanning operation is to be continued. In step S916, if the CPU 111 determines that an instruction indicating the continuation of the scan has been input, the process advances to step S909 and executes the next scanning operation in the manner as previously described. On the other hand, if the CPU 111 determines that there is no instruction indicating the continued execution of the scan in step S916, the process advances to step S917, and the CPU 111 updates the status of the scan request to "scan complete" and notifies the PC 160 of it. The process advances to step S918, and the CPU 111 deletes the executed scan request from the scan request list.

Next, the process advances to step S919, and the CPU 111 updates the scan request list displayed on the console unit 150. The process advances to step S920, and the CPU 111 determines whether or not an image data request has been received from the PC 160. If it is determined that the image data request has been received, the process advances to step S921. The image data stored in the storage unit 114 is transmitted to the PC 160, and the process advances to step S922. On the other hand, if it is determined that no image data request has been received in step S920, the process advances to step S922. In step S922, the CPU 111 determines whether or not a scan completion notification has been received from the PC 160. If the CPU 111 determines that the scan completion notification has been received, the processing ends. On the other hand, if it is determined that the scan completion notification has not been received in step S922, the process advances to step S920 and the CPU stands by for the next image data request.

As described above, according to the first embodiment, it is possible for the scan application of the PC to load image data which has been obtained by performing a scan operation in the MFP. As a result, the user can cause the MFP to read a document and load the image data of the read document to the PC without having to leave the document.

Second Embodiment

The above first embodiment has described an example in which the user first operates the PC to transmit a scan request to the MFP, takes the document to the MFP to have the MFP perform reading of the document, and causes the image data obtained from the reading to be transmitted from the MFP to the PC. In contrast, the second embodiment will describe an example in which a document is scanned first by an MFP 100 without a scan request from a PC, and the obtained image data is subsequently loaded to the PC. Note that the arrangements and the configurations of the MFP 100 and a PC 160 according to the second embodiment are the same as those of the above-described first embodiment, and a description thereof will be omitted.

First, a box function used by a user to cause a scanner 130 of the MFP 100 to read a document and store the obtained image data in a storage unit 114 will be described. An operation to store image data, obtained from the reading of a three-sheet document set in the scanner 130 of the MFP 100, in a box named "BOX1" will be described. At this time, the user sets a set of three sheets of documents on the scanner 130 and presses a box button on a console unit 150 to cause the MFP 100 to shift to a box mode for performing box settings. At this time, the setting contents at that point are displayed on the console unit 150. Here, since the name of the box to be used for storage is "BOX1", the user designates a box "BOX1" as the storage destination and presses the start button via the console unit 150. As a result, a box start instruction is issued, and the MFP 100 causes the scanner 130 to read the document sheets and stores the respective sets of image data in the storage location "BOX1" of the storage unit 114.

More specifically, when the box start instruction is issued, the CPU 111 receives the box start instruction and transmits a read instruction and an image processing instruction to the scanner 130 and an image processing unit 118, respectively. Accordingly, the scanner 130 reads the document set on a feeder (ADF), and the image processing unit 118 performs image processing on the image data obtained by the reading of the document and stores the image data in the box "BOX1" region of the storage unit 114. After the image data of the first sheet of the document has been stored in the storage unit 114, the CPU 111 issues the box start instruction to successively store the image data of the second sheet of the document in the same box as the image data of the first sheet of the document. This operation is repetitively performed for the third sheet of the document, and the processing ends when the CPU 111 is notified from the scanner 130 that there are no remaining document sheets in the feeder. This is the box scan of the box function.

In the second embodiment, the user uses the box function in advance to save the image data of the document in the storage unit 114 of the MFP 100.

FIGS. 10A and 10B are flowcharts for describing processing performed by the PC 160 to load the image data stored in the box of the MFP 100 into the PC according to the second embodiment. Note that although the processing shown in this flowchart is implemented by a CPU 301 executing a program deployed on a RAM 303, it will be described as processing executed by a scanner driver 400 of FIG. 4 here.

First, in step S1001, the scanner driver 400 receives a scan request from the scan application 410. Next, the process advances to step S1002, and the scanner driver 400 inquires of the MFP 100 whether the image data can be pulled up from the box. In step S1003, the scanner driver 400 determines whether or not it is possible to pull up the image data from the box. If it is determined that the image data can be pulled up, the process advances to step S1004. Otherwise, the processing ends.

In step S1004, the scanner driver 400 displays on a display unit 310 of the PC 160 that it has been set to a box access mode. Next, the process advances to step S1005, and the scanner driver 400 obtains a list of files of image data stored in the box from the MFP 100. Next, the process advances to step S1006, and the scanner driver 400 obtains the metadata of each file stored in the box from the MFP 100. Here, the metadata of each file is image data information such as the file name, the sheet size of the image, the resolution, and the like. The process advances to step S1007, and the scanner driver 400 displays, on the display unit 310, the list of files stored in the box that has been obtained from the MFP 100. The process advances to step S1008, and the scanner driver 400 determines whether or not the user has selected a desired file from the displayed list of box files. If it is determined that a file has been selected, the process advances to step S1009. On the other hand, if it is determined that a file has not been selected in step S1007, the process advances to step S1007.

In step S1009, the scanner driver 400 displays the metadata information of the file selected by the user on the display unit 310. Next, the process advances to step S1010, and the scanner driver 400 determines whether or not an obtainment request of the image data of the selected file has be input. If the obtainment request has been input, the process advances to step S1011. Otherwise, the process returns to step S1009.

In step S1011, the scanner driver 400 transmits a request to the MFP 100 to obtain the image data of the selected file. In step S1012, the scanner driver 400 receives the image data transmitted from the MFP 100 and stores the image data in a storage unit 302. At this time, if a plurality of items of image data of a plurality of document sheets are stored in the file, all items of the image data of the plurality of document sheets are received and stored in the storage unit 302. The process advances to step S1013, and the scanner driver 400 transmits a scan completion notification to the MFP 100. The process advances to step S1014, and the scanner driver 400 transfers, to the scan application 410, the image data received and stored in the storage unit 302 in step S1012, and the processing ends.

Figure 11:
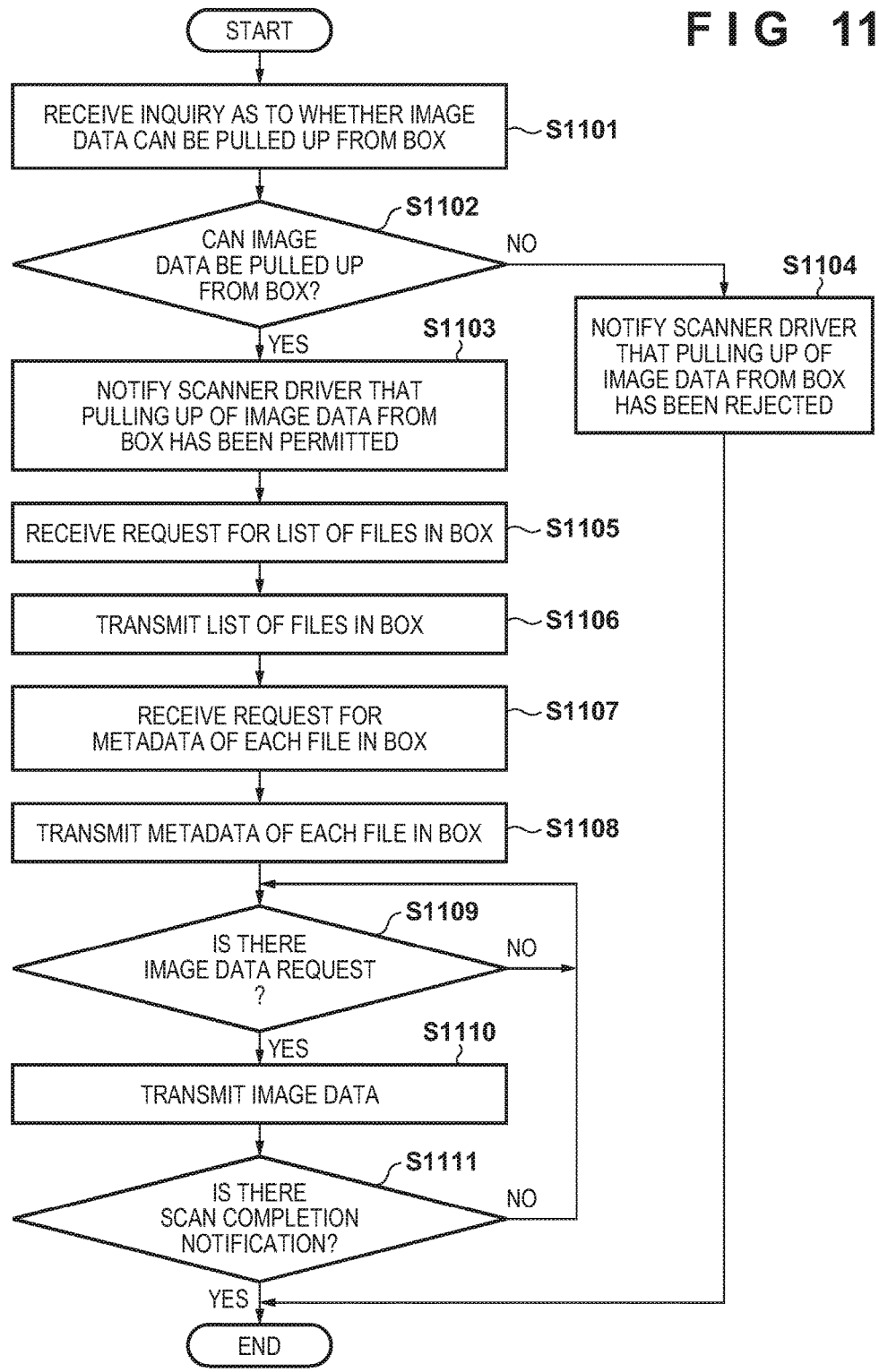
FIG. 11 is a flowchart for describing processing performed by the MFP to transmit the image data stored in the box to the PC in response to a request from the PC according to the second embodiment.

FIG. 11 is a flowchart for describing the processing in which the MFP 100 transmits, in response to a request from the PC 160, the image data stored in the box to the PC 160 according to the second embodiment. Note that the processing shown in this flowchart is implemented by a CPU 111 executing a program deployed from the storage unit 114 on a RAM 112.

First, in step S1101, the CPU 111 receives an inquiry from the scanner driver 400 of the PC 160 as to whether the image data of the box can be pulled up. Next, the process advances to step S1102, and the CPU 111 determines whether or not transmission of the image data of the box to the PC 160 is possible. If it is determined that the transmission is possible, the process advances to step S1103. Otherwise, the process advances to step S1104. In step S1104, the CPU 111 notifies the scanner driver 400 of the PC 160 that the pulling up of the image data of the box has been rejected, and the processing ends. In step S1103, the CPU 111 notifies the scanner driver 400 of the PC 160 that the pulling up of the image data of the box has been permitted, and the process advances to step S1105.

Note that the determination as to whether or not transmission of the image data of the box to the PC 160 is possible in step S1102 may be determined by, for example, whether or not the image data has been stored in the box or whether or not the box pull-up mode is settable in the MFP 100 and the mode has been turned on. Alternatively, a push-scan box may be arranged in the box and a determination may be made by whether or not the image data is in the box. Also, authentication information may be added to the box, and a determination may be made by whether or not the pull-up request is from a user who has a permission to access the box of the access request.

In step S1105, the CPU 111 receives a request, from the scanner driver 400 of the PC 160, to obtain the list of files stored in the box. The process advances to step S1106, and the CPU 111 transmits the list of files stored in the requested box. Next, the process advances to step S1107, and the CPU 111 receives a metadata obtainment request for each file on the transmitted list of files. Next, the process advances to step S1108, and the CPU 111 transmits the metadata of each file stored in the box to the scanner driver 400 of the PC 160.

The process advances to step S1109, and the CPU 111 determines whether or not an image data request has been received from the PC 160. If the image data request has been received, the process advances to step S1110. Otherwise, the process of step S1109 is executed. In step S1110, the CPU 111 transmits the requested image data to the PC 160. Next, the process advances to step S1111, and the CPU 111 determines whether or not the scan completion notification has been received from the scanner driver 400 of the PC 160. If the scan completion notification has been received, the processing ends. On the other hand, in step S1111, if the scan completion notification has not been received, the process advances to step S1109, and the CPU stands by for the image data request from the PC 160.

As described above, according to the second embodiment, a PC can obtain image data that has been stored in a box of an MFP in advance. Hence, the user can make the MFP read and store the document in a state in which the user is constantly by the side of the document and subsequently load the image data obtained by reading the document from a remote PC.

Third Embodiment

A pull-scan dedicated region is allocated in a storage unit 114 of an MFP 100 for a pull scan performed from a PC 160, and the MFP 100 scans, in response to a scan request from a scanner driver of the PC 160, a document and stores the obtained image data in the dedicated region. When the image data is requested by the scanner driver of the PC 160, the image data which is stored in the dedicated region may be read out and transmitted to the PC 160. Also, in order to have a common arrangement as the above-described second embodiment, it may be arranged so that the scanned image data will be stored in the same dedicated region even in the case of a push scan.

In the case of the pull scan, since the PC 160 and the MFP 100 are in a state of one-to-one connection at the time of job execution, a pull-scan job will not be input from another PC. However, in the case of a push scan, while a user is moving to the location of the PC 160 after executing a scan by the MFP 100 in advance, another user may execute a push scan or a pull scan on the MFP 100. Hence, there is a possibility that another image data will be written in the dedicated region before the user who executed the preceding push scan can obtain the image data by using his/her PC. In such a case, there is a possibility that the image data will be erroneously overwritten and that another PC may erroneously pull up the image data stored in the dedicated region of the MFP 100. Therefore, the third embodiment will describe an example to prevent the occurrence of such a problem. Note that the arrangements and the configurations of an MFP 100 and a PC 160 according to the third embodiment are the same as those of the above-described first embodiment, and a description thereof will be omitted.

Figure 12A:
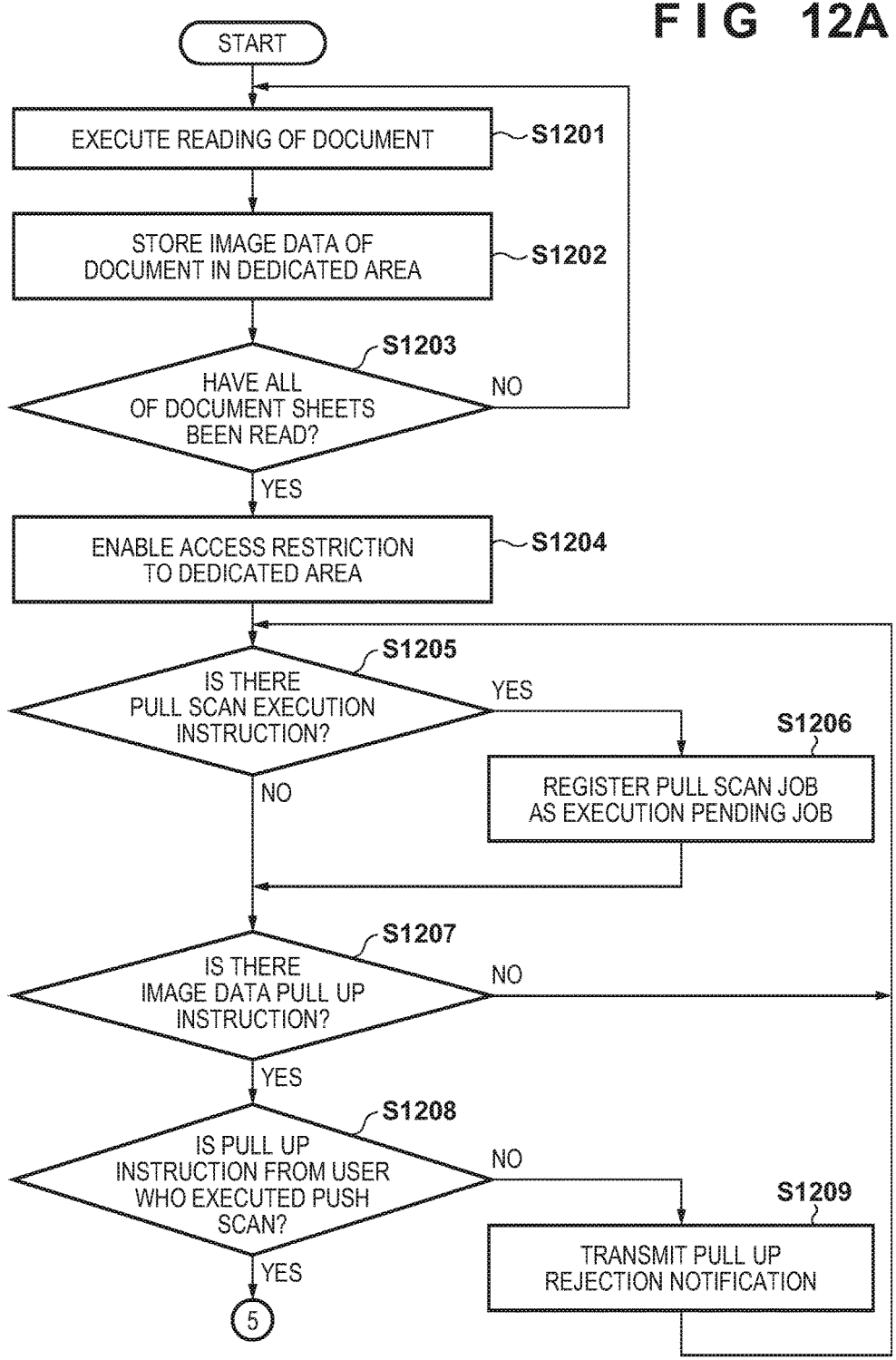

FIGS. 12A and 12B are flowcharts for describing the push scan processing performed by the MFP 100 according to the third embodiment. Note that the processing shown by this flowchart is implemented by a CPU 111 executing a program deployed from the storage unit 114 on a RAM 112.

Here, an example in which, after the reading of a document for a push scan and the storage of the image data in the dedicated region have been executed on the MFP 100 by a user, the MFP rejects the pulling up of the image data by a user other than the user who executed the push scan and prohibits writing in the dedicated region will be described.

First, in step S1201, the CPU 111 causes a scanner 130 to read a document. The process advances to step S1202, and the CPU 111 stores the image data obtained by the reading of the document in a pull-scan/push-scan dedicated region. In step S1203, the CPU 111 determines whether or not all of the document sheets set on the scanner 130 have been read. If it is determined that all of the document sheets have been read, the process advances to step S1204. Otherwise, the process advances to step S1201.

In step S1204, the CPU 111 enables the settings to restrict access to the dedicated region where the image data has been stored. Next, the process advances to step S1205, and the CPU 111 determines whether or not there is a pull-scan execution instruction from an external device such as a PC. If it is determined that there is a pull-scan execution instruction, the process advances to step S1206 to register the instructed pull-scan job as a pending job, and the process advances to step S1207. Also, if it is determined in step S1205 that there is no pull-scan execution instruction, the process advances to step S1207. In step S1207, the CPU 111 determines whether or not there is an image-data pull-up request from a PC or the like. If it is determined that there is the pull-up request, the process advances to step S1208. Otherwise, the process advances to step S1205. In step S1208, the CPU 111 determines whether or not the user who issued the pull-up request is the same user who executed the push scan in step S1201. Here, this is determined by whether or not the same PC has been used. If it is determined that the user is the user who executed the push scan, the process advances to step S1210. Otherwise, the process advances to step S1209. In step S1209, the CPU 111 transmits a pull-up rejection notification to the external device that issued the pull-up request, and the process advances to step S1205.

In step S1210, the CPU 111 reads out the image data stored in the dedicated region and transmits the image data to the scanner driver 400 of the PC 160 that issued the pull-up request. The process advances to step S1211, and the CPU 111 determines whether or not all items of the image data stored in the dedicated region by the user have been transmitted. If it is determined that all items of the image data have been transmitted, the process advances to step S1212. Otherwise, the process advances to step S1210. In step S1212, the CPU 111 disables the settings restricting access to the dedicated region. Next, the process advances to step S1213, and the CPU 111 determines whether or not a pending pull-scan job that was put on hold in step S1206 is present. If it is determined that the pending pull-scan job is present, the process advances step S1214. In step S1214, the CPU 111 executes the pending pull-scan job, and ends the processing. If it is determined in step S1214 that the pending pull-scan job is not present, the processing ends.

As described above, according to the third embodiment when image data is stored in a pull-scan or push-scan dedicated region, an access restriction is set to the dedicated region to prevent the execution of a pull scan by a user other than the user who stored the image data. In addition, it is possible to prevent the image data that is stored in the dedicated region from being overwritten or pulled up by a third party.

In the third embodiment, if a pull-scan execution instruction is issued after the access restriction to the dedicated region has been set, the pull scan is put on hold. However, it may be set so as to execute the pull scan whose execution has been instructed, temporarily store the image data obtained by the scanning in a region of the storage unit 114 other than the dedicated region, and move the image data to the dedicated region after the access restriction is canceled.

Also, it may be set so as to reject the pull-scan-job execution request without putting the request itself on hold.

Additionally, in the third embodiment, the cancellation of the access restriction of the dedicated region is performed after the transmission of all items of the image data has been completed. However, the present invention is not limited to this, and it may be set so as to cancel the access restriction before the transmission of all items of the image data is completed by, for example, ending the transmission processing when a completion notification is received from the scanner driver.

Fourth Embodiment

The above-described third embodiment has described an example in which, after the storage of the image data in the dedicated region, the MFP 100 rejects the pulling up of image data from the dedicated region by a user other than the user who stored the image data and prohibits writing in the dedicated region. In contrast, the fourth embodiment will describe an example in which erroneous pull-up and writing of image data are prevented by not allowing a network button (console button) to be pressed after the image data has been stored in the dedicated region. Note that the arrangements and the configurations of an MFP 100 and a PC 160 according to the fourth embodiment are the same as those of the first embodiment, and a description thereof is omitted.

FIG. 13 is a flowchart for describing the push-scan processing performed by the MFP 100 according to the fourth embodiment. Note that the processing shown in this flowchart is implemented by a CPU 111 executing a program deployed from a storage unit 114 on a RAM 112.

First in step S1301, the CPU 111 causes a scanner 130 to read a document. The process advances to step S1302, and the CPU 111 stores the image data obtained from the scanning in a pull-scan/push-scan dedicated region of the storage unit 114. In step S1303, the CPU 111 determines whether or not all of the document sheets set on the scanner 130 have been read. If it is determined that all of the document sheets have been read, the process advances to step S1304. Otherwise, the process advances to step S1301.

In step S1304, the CPU 111 disables the network button of a console unit 150. As a result, the MFP 100 will not be able to shift to a network mode in which a pull scan can be executed by an instruction via the console unit 150. Next, the process advances to step S1305, and the CPU 111 determines whether or not there is an image-data pull-up request from an external device such as a PC. If it is determined that there is the pull-up request, the process advances to step S1306. Otherwise, the process advances to step S1305. In step S1306, the CPU 111 determines whether or not a user of the PC that issued the pull-up request is the user who executed the push scan in steps S1301 to S1303. Here, this is determined by whether the same PC has been used. If it is determined that the user is the user who executed the push scan, the process advances to step S1307. Otherwise, the process advances to step S1308. In step S1308, the CPU 111 transmits a pull-up rejection notification to a scanner driver of the PC, and the process advances to step S1305.

In step S1307, the CPU 111 reads out the image data stored in the dedicated region and transmits the scanner driver 400 of the PC 160. In step S1309, the CPU 111 determines whether or not all items of the image data stored in the dedicated region have been transmitted. If it is determined that all items of the image data have been transmitted, the process advances to step S1310. Otherwise, the process advances to step S1307. In step S1310, the CPU 111 enables the network button of the console unit 150, and the processing ends.

As described above, according to the fourth embodiment, when a user executes a push scan, the MFP disables the network button of the console unit. This can prevent an input of a pull-scan job by another user before the push scan has ended. As a result, it is possible to prevent the image data stored by the push scan from being overwritten or erroneously pulled up.

Other Embodiments

According to the embodiments of the present invention, a document can be read by an image reading apparatus and loaded into an information processing apparatus without a user having to leave the location of the document.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-251922, filed Dec. 26, 2016, which is hereby incorporated by reference herein in its entirety.

What is claimed is:

1. An image reading system that includes an image reading apparatus and an information processing apparatus,
wherein the image reading apparatus comprising:
a first memory storing a set of instructions; and
one or more first processors that execute instructions of the set of the instructions and cause the image reading apparatus to function as:
a first reception unit configured to receive, from the information processing apparatus, a scan job which includes setting information used to read a document;

an accepting unit configured to accept a user instruction for instruction to start reading of the document by using the setting information included in the scan job received by the first reception unit;

a reading unit configured to cause a reader to read the document and execute the scan job in accordance with the user instruction accepted by the accepting unit; and a first transmission unit configured to transmit an execution status of the scan job received by the first reception unit to the information processing apparatus, wherein the first reception unit further receives, from the information processing apparatus, a request for image data generated by reading the document by the reader, and wherein the first transmission unit transmits the image data to the information processing apparatus in accordance with the received request, wherein the information processing apparatus comprising:

a second memory storing a set of instructions; and one or more second processors that execute instructions of the set of the instructions and cause the information processing apparatus to function as:

a second transmission unit configured to transmit the scan job which includes the setting information used for the reading of the document by the reader; and a second reception unit configured to receive the execution status of the scan job transmitted by the first transmission unit, wherein the second transmission unit further transmits the request to the image reading apparatus in accordance with the execution status of the scan job received by the second reception unit, and wherein the second reception unit further receives the image data transmitted from the first transmission unit.

2. The system according to claim 1, wherein the image reading apparatus further comprises a storage unit configured to store the scan job which includes the setting information received by the first reception unit, and wherein the first transmission unit transmits information indicating that the scan job has been stored in the storage unit to the information processing apparatus.

3. The system according to claim 1, wherein the first transmission unit transmits, in accordance with a completion of the reading of the document by the reader, information indicating the completion of the reading of the document to the information processing apparatus.

4. The system according to claim 2, wherein the one or more second processors execute instructions and further cause the information processing apparatus to function as a first display unit configured to cause a first display to display a screen, wherein the first display unit causes the display to display a screen for waiting for a start of the reading of the document in accordance with the second reception unit having received information indicating that the scan job received by the first reception unit of the image reading apparatus has been stored in the storage unit.

5. The system according to claim 1, wherein the setting information included in the scan job received by the first reception unit includes a reading resolution and a reading color mode of the reader.

6. The system according to claim 1, wherein the first reception unit notifies, in accordance with the start of the reading of the document by the reader, the information processing apparatus that the document is being read.

7. The system according to claim 1, wherein the one or more first processors execute instructions and further cause the image reading apparatus to function as a second display unit configured to cause a second display to display the setting information included in the scan job received by the first reception unit, wherein the reading of the document by the reader is performed by using the setting information displayed by the second display unit.

8. The system according to claim 7, wherein the second display unit displays a list of scan jobs received by the first reception unit, and wherein the reading unit causes the reader to read the document by using the setting information included in a scan job selected by a user from the scan jobs displayed by the second display unit.

9. The system according to claim 8, wherein the second display unit causes the second display to display, after the reading of the document by the reader has been completed, a screen to accept a selection as to whether the reading of the document by the reader is to be continued.

10. An image reading apparatus comprising:

a memory storing a set of instructions; and one or more processors that execute instructions of the set of the instructions and cause the image reading apparatus to function as:

a reception unit configured to receive, from an information processing apparatus, a scan job which includes setting information used to read a document;

an accepting unit configured to accept an user instruction for instructing to start reading of the document by using the setting information included in the scan job received by the reception unit;

a reading unit configured to cause a reader to read the document by accepting the user instruction by the accepting unit; and a transmission unit configured to transmit an execution status of the scan job to the information processing apparatus, wherein the reception unit further receives an image data obtainment request from the information processing apparatus which received the execution status of the scan job transmitted by the transmission unit, and wherein the transmission unit further transmits, to the information apparatus, the image data obtained by reading the document by the reader in accordance with the image data obtainment request.

11. The apparatus according to claim 10, wherein the transmission unit transmits, to the information processing apparatus, information indicating that the document is being read by the reader.

12. The apparatus according to claim 11, wherein the transmission unit transmits, in accordance with the acceptance of the user instruction by the accepting unit, information indicating that the document is being read by the reader to the information processing apparatus.

13. The apparatus according to claim 12, wherein the setting information included in the scan job includes a reading resolution and a reading color mode of the reader.

14. An image reading method of an image reading system that includes an image reading apparatus and an information processing apparatus, the method comprising:

wherein in the image reading apparatus, obtaining, from the information processing apparatus, a scan job which includes setting information used to read a document;

accepting a user instruction for instructing to start reading of the document by using the setting information included in the obtained scan job;
generating image data by reading the document in accordance with the user instruction;
transmitting, to the information processing apparatus, an execution status of the obtained scan job;
receiving, from the information processing apparatus, a request for image data generated by reading the document; and
transmitting the image data to the information processing apparatus in accordance with the received request, and
wherein in the information processing apparatus,
transmitting the scan job which includes the setting information used to read the document;
receiving the execution status of the scan job transmitted from the image reading apparatus;
transmitting the request to the image reading apparatus in accordance with the received execution status of the scan job; and
receiving the image data transmitted from the image reading apparatus.

* * * * *